Dec. 22, 1936.  H. D. STEVENS  2,065,033
METHOD AND APPARATUS FOR MAKING INNER TUBES
Filed Jan. 15, 1935  7 Sheets-Sheet 1
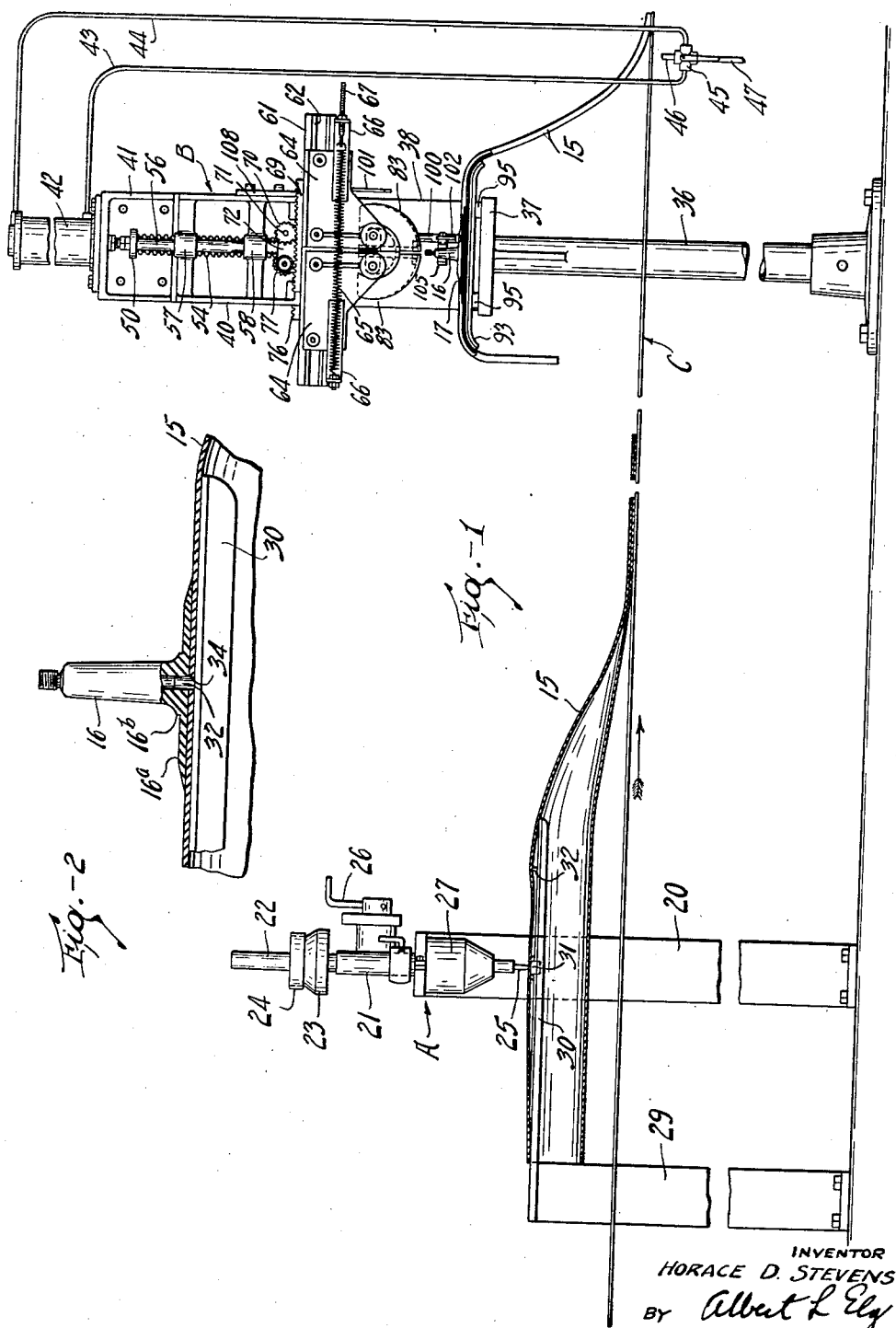
INVENTOR
HORACE D. STEVENS
BY Albert L. Ely
ATTORNEY

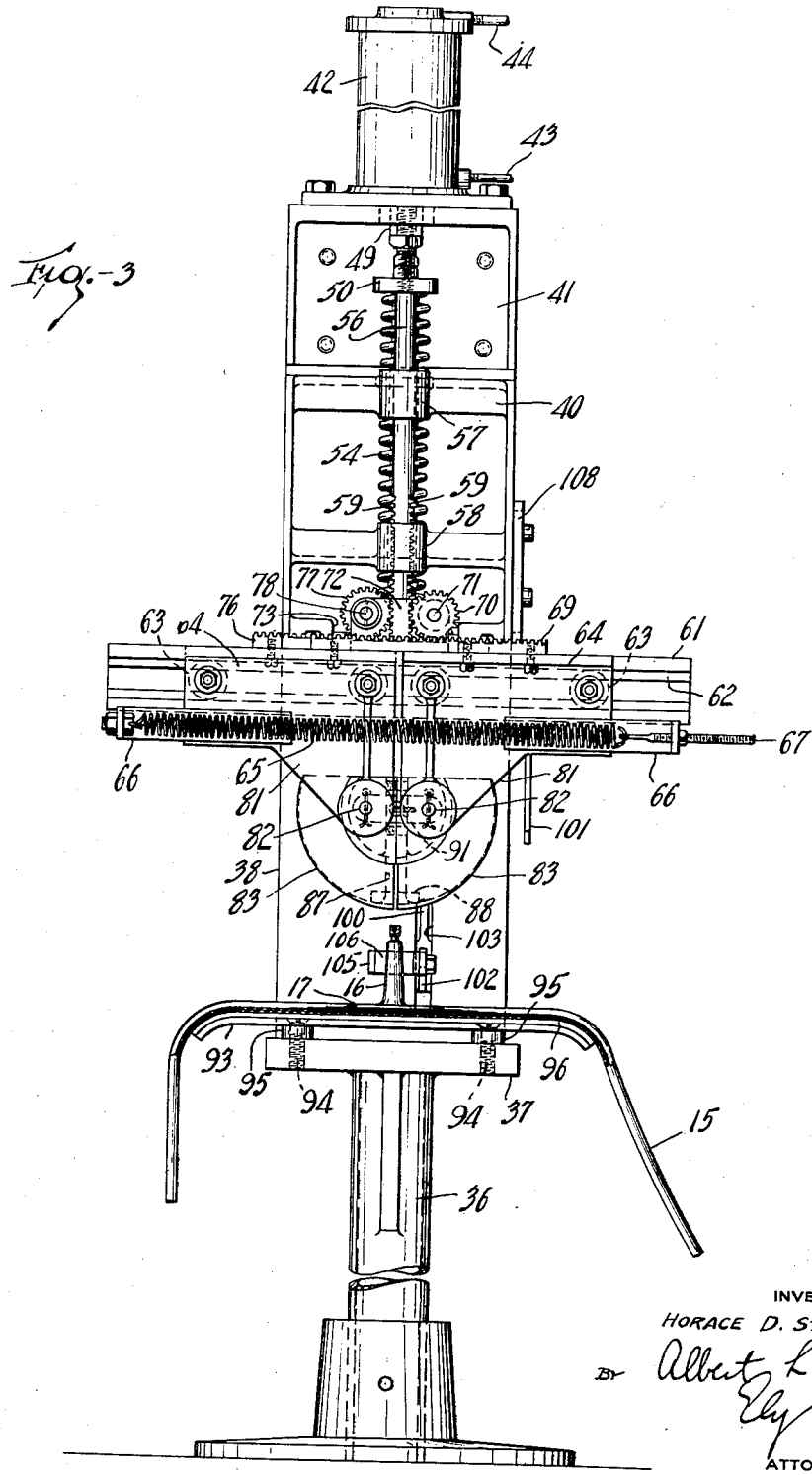

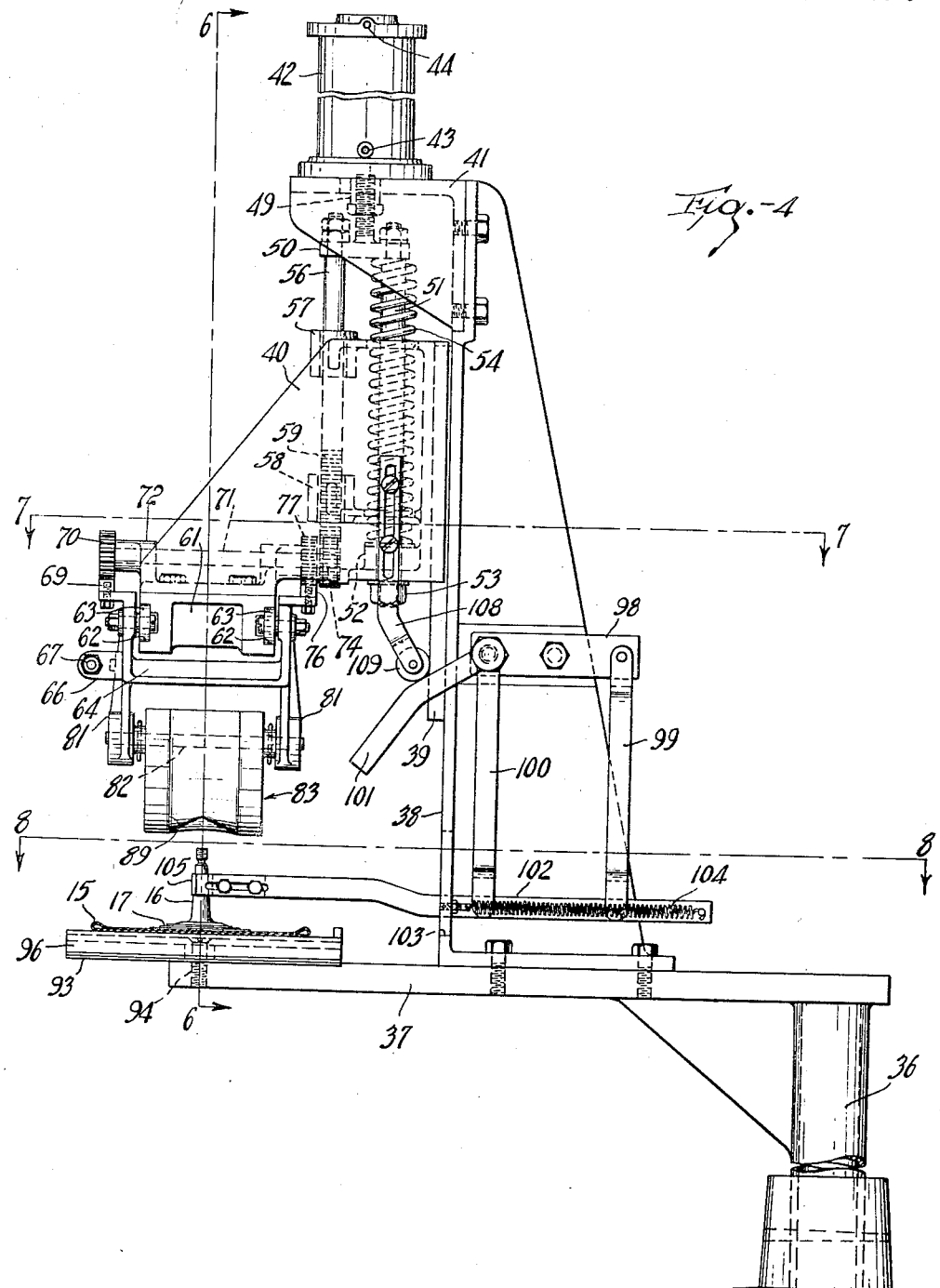

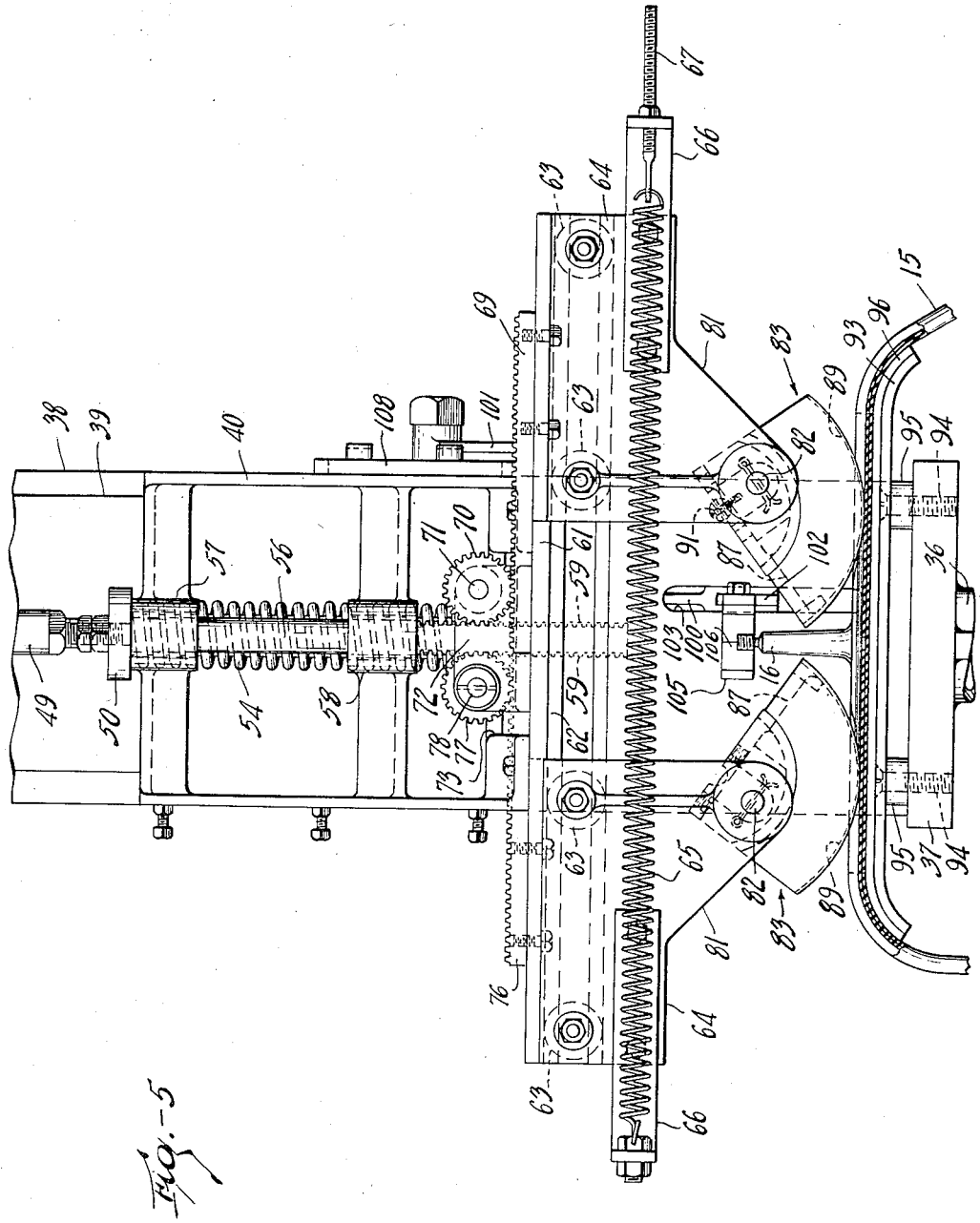

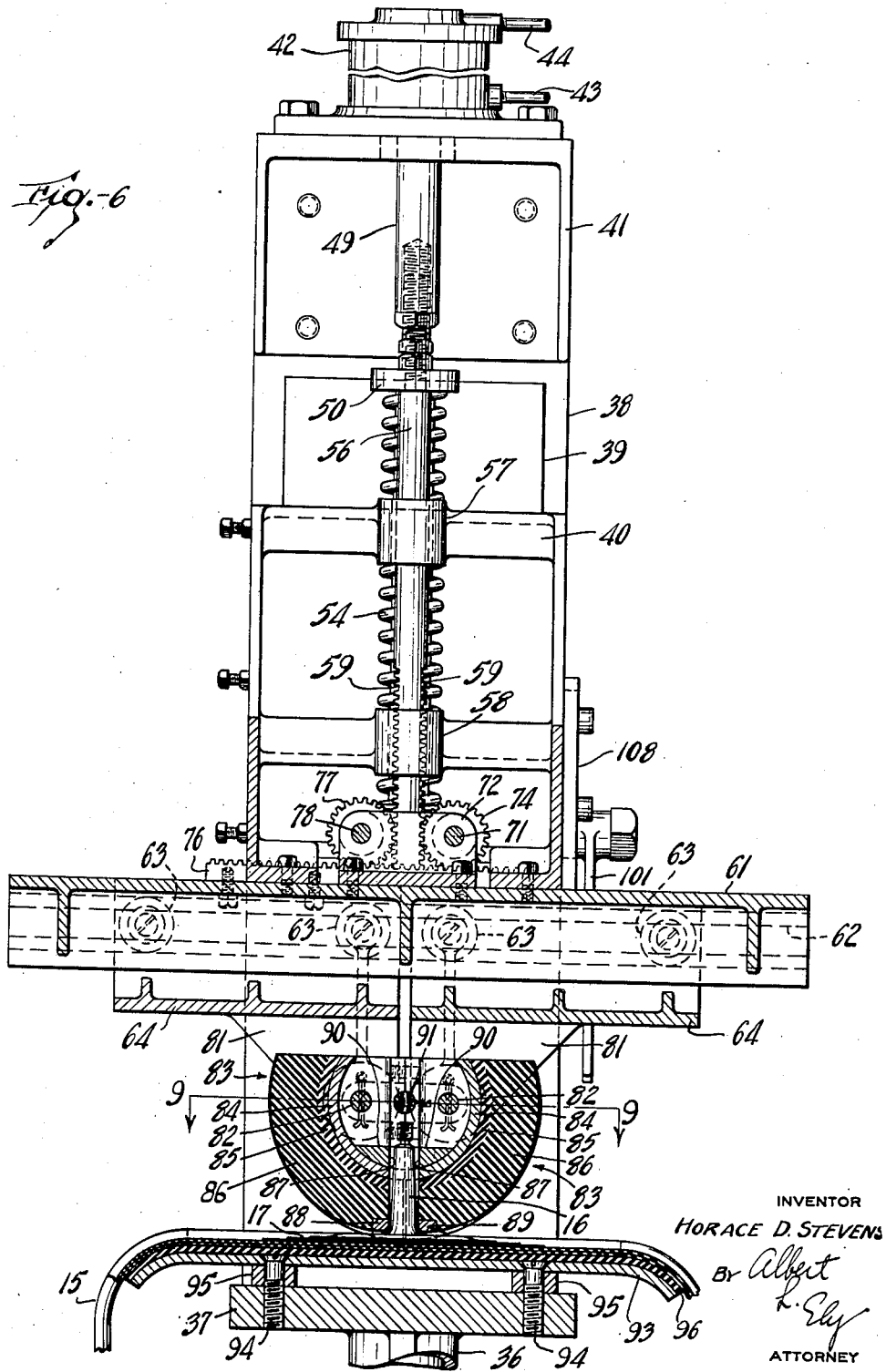

Dec. 22, 1936.  H. D. STEVENS  2,065,033
METHOD AND APPARATUS FOR MAKING INNER TUBES
Filed Jan. 15, 1935  7 Sheets-Sheet 6

INVENTOR
HORACE D. STEVENS
BY Albert L. Ely
ATTORNEY

Dec. 22, 1936.   H. D. STEVENS   2,065,033
METHOD AND APPARATUS FOR MAKING INNER TUBES
Filed Jan. 15, 1935   7 Sheets-Sheet 7

INVENTOR
HORACE D. STEVENS
BY Albert L Ely
ATTORNEY

Patented Dec. 22, 1936

2,065,033

UNITED STATES PATENT OFFICE 2,065,033

METHOD AND APPARATUS FOR MAKING INNER TUBES

Horace D. Stevens, Akron, Ohio, assignor to The Firestone Tire & Rubber Company, Akron, Ohio, a corporation of Ohio Application January 15, 1935, Serial No. 1,891

17 Claims. (Cl. 154—14)

This invention relates to methods and apparatus for making inner tubes for pneumatic tires, and more especially it relates to procedure and mechanism for incorporating rubber valve stems or metal valve stems with a rubber base, in inner tubes during manufacture of the latter.

The chief objects of the invention are to provide an improved method of mounting rubber valve stems or metal valve stems with a rubber base, in inner tubes for pneumatic tires; and to provide improved apparatus for the practice of said method. More specifically the invention aims to provide apparatus for concurrently compacting the assembled structure comprising inner tube, valve stem, and a pad of unvulcanized rubber that overlies the base-flange of said valve stem. Another object is the provision of means for compacting the aforementioned structure by yielding, rolling pressure. Further objects include the saving of time and labor; and the production of inner tubes of superior construction. Other objects will be manifest.

Of the accompanying drawings:

Figure 1 is a front elevation of apparatus comprising and adapted to carry out the invention, in its preferred form, and the work therein, one unit of the latter being shown in section;

Figure 2 is a sectional detail of the work, on a larger scale, and a portion of the apparatus, as it appears at the second step of the improved method;

Figure 3 is a front elevation of the compacting or pressing unit of the apparatus shown in Figure 1, on a larger scale, in inoperative position, and the work in place therein;

Figure 4 is a side elevation of the apparatus shown in Figure 3, as viewed from the right thereof;

Figure 5 is a fragmentary front elevation, on a larger scale, of the compacting or pressing unit, in operative position;

Figure 6 is a section on the line 6—6 of Figure 4;

Briefly stated, the improved method of building inner tubes comprises the forming of a valve-hole in a length of unvulcanized rubber tubing, relatively near one end thereof, mounting a rubber valve stem or a metal valve stem having a rubber base, upon the outside of the tube with the axial passage of the said valve stem in registry with the valve hole in the tube, mounting a valve-pad of unvulcanized rubber composition upon the base flange of the valve stem and adjacent surface of the tube, and then compacting the assembly by the application of yielding rolling pressure moving from the middle of the pad toward the margin thereof.

Figure 10:
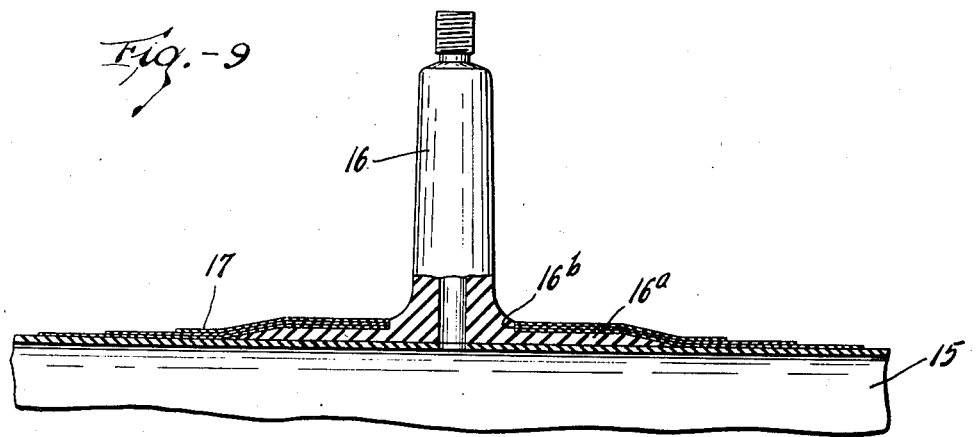
Figure 10 is a detail sectional view, on a larger scale, of the finished work.

The practice of the aforesaid method is accomplished by the use of the apparatus shown in Figure 1 wherein is shown a hole-forming unit A, a compacting unit B, an endless conveyor C for carrying work from unit A to unit B, and the work comprising a tube 15 of unvulcanized rubber, a rubber valve stem 16 which preferably is at least partly vulcanized, and an unvulcanized rubber valve pad 17. As is shown most clearly in Figures 8 and 10, the valve stem structure 15 comprises a unitary base flange 16a that is of rhombus shape and is beveled at its margins, and the valve-pad 17 comprises a plurality (three) of rhombus shaped pieces of unvulcanized rubber sheet, said pieces being of different sizes and assembled in superposed relation to provide a unitary structure having stepped marginal portions. The valve-pad has an axial aperture through which the valve stem 16 extends in the assembled inner tube, the pad fitting closely about a shoulder 16b formed at the base of the valve stem. Although the valve stem flange 16a and pad 17 are shown as of rhombus shape, it is not essential that they be of this shape, and the apparatus will function with equal facility if the parts mentioned are of circular shape.

The hole-forming or perforating unit A comprises an upright support 20 that carries at its top a journal bearing 21 for a vertical shaft 22 that carries a pulley 23 engaged by a driving belt 24 connected to a suitable source of power (not shown) for rotating shaft 22. The lower end of shaft 22 carries a circular, tubular punch or cutting tool 25, and the said shaft is arranged to be raised and lowered in its journal bearing by suitable means (not shown) manually operated by a hand crank 26. An electrically operated heating element 27 is disposed about the lower end portion of shaft 22 for heating the tool 25. Adjacent the support 20 is a second upright support 29 that carries an overhanging arm 30 that extends laterally beneath the tool 25 and is provided thereat with a suitable cutting block located in a boss 31 against which the tool 25 operates. Between the boss 31 and the free end of arm 30 is an upstanding stud 32 of the same size as the tool 25.

In the operation of the perforating unit A, the tool 25 normally is in an elevated position, and is constantly driven and heated. An unvulcanized rubber tube 15 is delivered to the operator of the unit upon conveyor belt C, the upper surface of its trailing end portion previously having been swabbed with a hydrocarbon rubber solvent such as benzol. The operator removes the solvent-treated end portion of the tube from the conveyor, passes it onto the arm 30 in the manner shown in Figure 1, and operates hand crank 26 to lower the tool 25 into engagement with the tube-end and thereby to cut an aperture 34, Figure 2, in the wall thereof. The operator then restores the tool to normal inoperative position, moves the tube end toward the free end of arm 30 and positions it with the stud 32 projecting through aperture 34 and extending somewhat above the tube.

The valve stem 16 is then applied to the tube by positioning the stud 32 in the axial passage of the valve stem, as shown in Figure 2, the flange 16a of the stem adhering to the solvent-treated surface of the tube with sufficient tenacity to retain the valve stem in place during subsequent handling of the tube. The tube with valve stem thereon is then removed from the arm 30 and dropped onto the conveyor C which carries it to unit B. The compacting unit B comprises a pedestal support 36 upon the top of which is carried an overhanging table 37 that extends forwardly over the conveyor C. Mounted upon said table is an upstanding bracket 38, the front face of which is formed with a vertical dovetail guide 39 upon which is mounted a slide 40. Above the dovetail guide 39 the bracket 38 carries a forwardly projecting bracket 41 upon which is mounted a vertically disposed, double-acting, fluid pressure operated cylinder 42. For operating the latter, fluid-conducting inlet and outlet pipes 43, 44 having communication with the respective ends of said cylinder extend therefrom to a four-way manually operated valve 45 provided with an exhaust port 46 and having communication with a source of pressure fluid (not shown) through a supply pipe 47.

The cylinder 42 has a downwardly extending piston rod 49, upon the lower end of which is mounted a yoke or crosshead 50. Secured to said crosshead, at the rear thereof, is a downwardly extending rod 51 that passes freely through an apertured boss 52 formed on the bottom wall of slide 40 and has a nut 53 threaded onto its lower end, below said slide, whereby upward movement of the crosshead 50 will draw the slide upwardly. A compression spring 54 is mounted upon the rod 51 between crosshead 50 and boss 52, with the result that downward movement of the crosshead will move the slide downwardly, continued downward movement of the crosshead against the pressure of spring 54 being permitted after downward movement of the slide has been halted, as presently will be explained. Also secured to the crosshead 50, at the front thereof, is a downwardly extending shaft or rod 56 that slidably extends through a pair of bearing brackets 57, 58 formed on the slide 40, the lower end portion of said rod 56 being formed with two longitudinal series of rack teeth 59, 59 disposed at diametrically opposite points on said rod, said teeth extending laterally as viewed from the front of the machine.

The slide 40 extends forwardly of the bracket 38, and secured to the under side thereof, at its front end, is an elongate frame 61 disposed transversely of said slide. The frame 61 is formed with longitudinally extending recessed trackways 62, 62 in its respective front and rear marginal walls, which trackways receive the wheels or rollers 63, 63 of a pair of opposed carriages 64, 64. The latter are suspended from said wheels, below the frame 61, each carriage being provided with a pair of said wheels on each side thereof that travel in the respective trackways 62. The carriages are movable toward and away from each other longitudinally of frame 61, and normally are yieldingly urged toward each other by a tension spring 65 connected at its respective ends to L-shaped bracket arms 66, 66 mounted upon the front faces of the respective carriages 64, the spring-connection including an adjustable spring-anchor 67 for adjusting the tension of the said spring.

The carriages 64 are concurrently movable away from each other and away from the central vertical plane of the device, against the tension of spring 65, and for so moving said carriages, the carriage shown at the right in Figures 1, 3, 5, and 6 has a rack 69 mounted upon its top surface at the front margin thereof, said rack extending longitudinally of the carriage and projecting well beyond that end of the carriage that is adjacent the other carriage. The rack 69 is meshed with a pinion 70 that is mounted upon the front end of a horizontal shaft 71, the latter being journaled at two points in a dual bearing bracket 72 that is mounted upon the top face of frame 61 and extends upwardly through a recess 73 in slide 40. The rear end of shaft 71 carries a pinion 74 that is meshed with one of the racks 59 on the vertical, axially-reciprocable shaft or rod 56.

Figure 7:
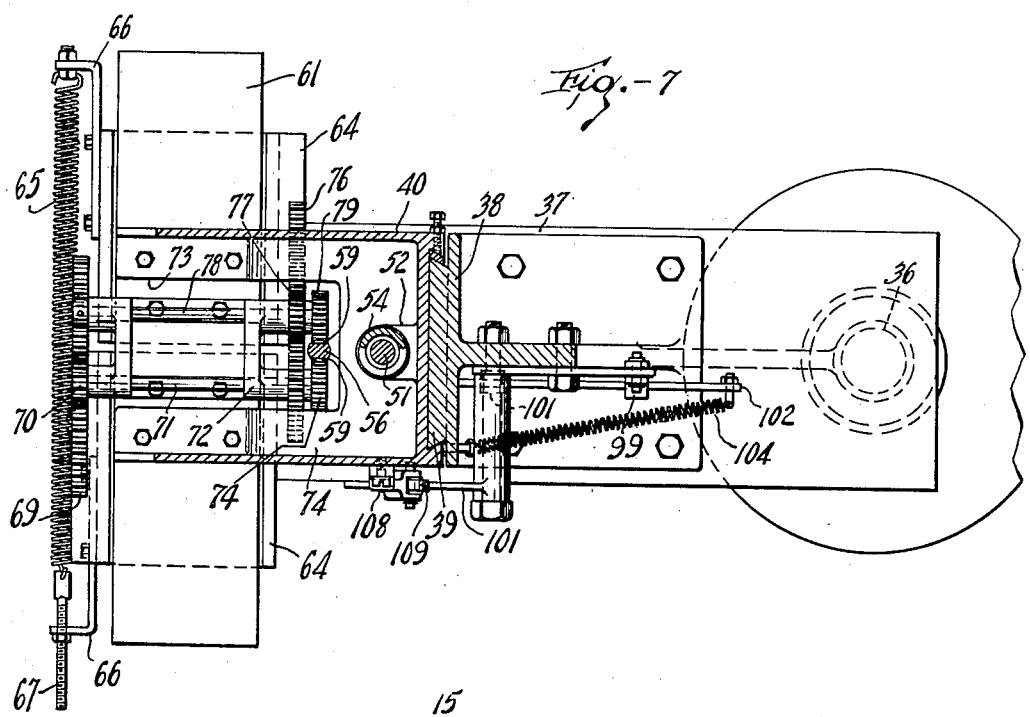
Figure 7 is a section on the line 7—7 of Figure 4.

In like manner the top surface of the other carriage 64 is provided with a rack 76 at the rear margin thereof, said rack being meshed with a pinion 77 that is mounted upon a horizontal shaft 78, the latter being disposed parallel to shaft 71 and journaled at two points in the dual bearing bracket 72. On the rear end of shaft 71, beside pinion 77, is a pinion 79, Figure 7, that is meshed with the other rack 59 on the rod 56. The arrangement is such that downward movement of the rod 56 and racks 59, relatively of the slide 40 will move the carriages 64 apart as shown in Figure 5, the limit of said movement being reached when crosshead 50 strikes bearing bracket 57. Reverse movement of the rod 56 and its racks moves the carriages back to their normal, closely adjacent positions as shown in Figures 1, 3, and 6, which movement is assisted by the tension spring 65. The spreading movement of the carriages 64 as described cannot occur, however, until slide 40 has been moved downwardly and brought to a stop in a manner presently to be explained.

The adjacent ends of the carriages 64 are each formed with a pair of downwardly extending bracket arms 81, 81, and each pair of the latter has a pivot pin 82 journaled therein. The pivot pins 82 are parallel to each other, are in the same horizontal plane, and are disposed transversely of the path of movement of the carriages 64. Mounted upon each pivot pin 82 is a work pressing member generally designated 83, which members are of substantially identical construction. In general shape, each member 83 is a diametric section of a cylinder that has had a chordal segment removed. In the normal inoperative position of the device, the diametral faces of the pressing members abut each other, and are vertically disposed in the medial vertical plane of the device, the said diametral faces being perpendicular to the flat face resulting from the removal of the chordal segment, the latter face being disposed at the top of the pressing members.

Figure 9:
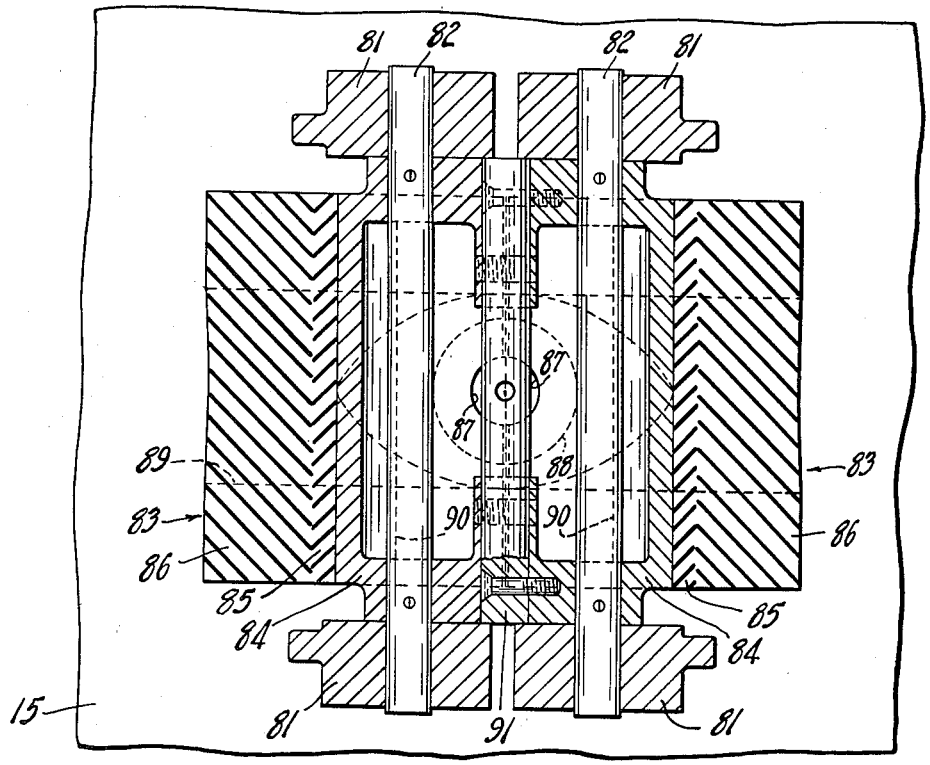
Figure 9 is a section, on a larger scale, on the line 9—9 of Figure 6.

The peripheral faces of the members 83 are concentric about an axis lying in the diametral dividing plane of the members, and the said members are eccentrically mounted upon the pivot pins 82, the latter being disposed laterally of the axis of the members, on opposite sides thereof. As is most clearly shown in Figures 6 and 9, each presser member 83 comprises a metal hub portion 84, a relatively thin layer of hard rubber composition 85 vulcanized to the outer arcuate surface thereof, and a relatively thick layer of resilient soft rubber 86 vulcanized to said hard rubber layer. The abutting diametral faces of the members are complementally radially recessed at 87, 87 to provide a socket which freely receives a valve stem 16 in the operation of the device, and the outer end of said socket, adjacent the periphery of the members, is reinforced by a divided metal ring 88 that is molded into the rubber layer 86. The perimeter of each member 83 is formed in its central region with a very shallow circumferential groove 89 that increases in depth adjacent the recess 87, see Figure 6, which groove generally conforms to the transverse profile of the valve pads 17 of the work. Interiorly of each hub 84, at the lowest point thereof, is a metal weight 90 which serves to urge each member 83 to a determinate position. An axially arranged registering pin 91 is mounted in an axial recess in one of the hubs 84 and normally seats in a complemental recess in the other hub, in the inoperative position of the members 83, for assuring that the latter assume proper angular positions. Divided metal ring 88 may be omitted in the event the machine is to operate on metal valve stems with a rubber base, this modification being resorted to in order to avoid damage to the threads of the metal valve stem.

Directly below the presser members 83 is a work support that is mounted upon the overhanging table 37, said work support comprising a rectangular metal plate 93 that is disposed parallel to the path of movement of the carriages 64, and is removably attached to the table 37 by screws 94. Spacer blocks 95, 95 are positioned between the plate 93 and the table to provide the proper elevation for the plate according to the thickness of the work to be operated upon. Preferably the top face of the plate 93 is covered with a pad 96 of resilient material, such as sponge rubber, to provide a yielding work-engaging surface, and the respective end portions of the plate are downwardly curved as shown so that a tube 15 may be draped lengthwise over the plate without sharply flexing the tube.

To assure accurate positioning of the work in the pressing unit, means is provided for engaging the valve stem 16 in the inoperative postion of the unit, said positioning means automatically being removed during the operation of the unit. The positioning means, best shown in Figures 4, 7, and 8, comprises a plate 98 that is secured to a lateral face of the rearwardly extending web of bracket 38, and pivotally mounted upon said plate 98 is a depending arm 99, and a bell crank comprising angularly disposed arms 100, 101. Arm 99 and arm 100 of the bell crank are of the same length, and are parallel to each other, being so maintained by an elongate link 102 that is pivotally connected to the free ends of said arms. Link 102 extends forwardly through a slot 103 formed in bracket 38, and normally is yieldingly urged longitudinally forwardly by a tension spring 104 that is connected to the rear end of the link and to a fixed point on bracket 38.

Figure 8:
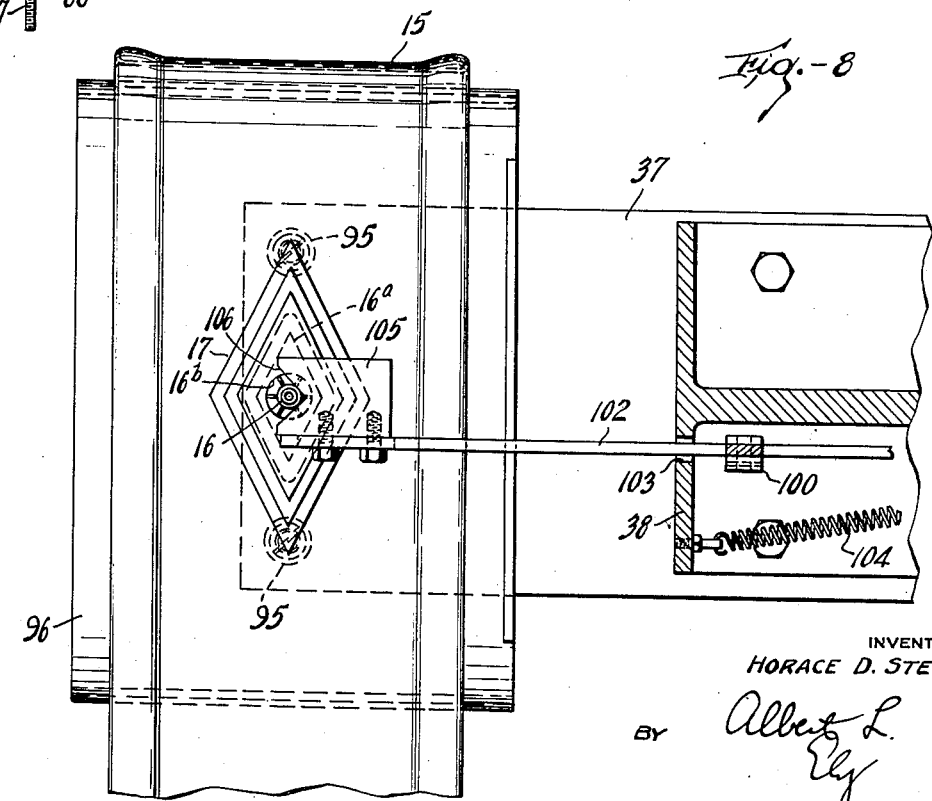
Figure 8 is a section on the line 8—8 of Figure 4.

Adjustably secured to the forward end of the link 102 is a notched centering block 105, which, in the inoperative position of the apparatus, is disposed beneath the presser members 83 with the notch 106 therein presented forwardly, as is best shown in Figure 8. The arrangement is such that when a tube 15 is mounted on supporting plate 93 and the valve stem 16 of said tube positioned in notch 105, said valve stem will be axially aligned with recesses 87 in the presser members 83. The centering block 105 is arranged to be retracted during the work-pressing operation of the unit, and to this end a bracket-arm 108 is mounted for vertical adjustment upon one side of slide 40, said arm extending below the lower margin of said slide and having a roller 109 journaled in its lower end. The roller 109 bears against the obliquely disposed arm 101 of the bell crank, the arrangement being such that when the slide 40 descends during the operation of the unit, the bell crank is so swung on its pivot that the outer end of its arm 100 is swung rearwardly, with the result that link 102 is retracted and with it the centering block 105. Thus the way is cleared for the presser members 83 to operate upon the work.

In the operation of the compacting and pressing unit B, the work delivered by conveyor C from unit A is removed from said conveyor by the operator of unit B who mounts a valve pad 17 upon the valve stem 16 of the work, and then drapes the tube 15 thereof lengthwise over the support 93, at the same time positioning the said valve stem in the notch 106 of centering block 105. The operator then operates valve 45 to discharge the lower end of cylinder and concurrently to charge the upper end thereof, thus causing the crosshead 50 to move downwardly and thereby to lower the slide 40. Initial downward movement of the slide 40 causes roller 109 to swing the bell crank, against the tension of spring 104, in the direction which retracts centering block 105.

Continued downward movement of said slides carries the presser members 83 into engagement with the work, the valve stem 16 extending into the recess 87 in said members, and the divided metal ring 88 in said members bearing against the valve pad 17 closely adjacent the valve stem so as to press the pad firmly into engagement with the shoulder 16b at the base of the valve stem, as is most clearly shown in Figure 6. As downward movement of the slide 40 is arrested by engagement of the presser members 83 with the work, continued downward movement of the crosshead 50, against the pressure of spring 54, moves the rod 56 relatively of the slide 40 and thus causes racks 59 on said rod to rotate pinions 74 and 79 that are meshed with said racks. Rotation of pinions 74 and 79 causes rotation of pinions 70 and 77 respectively, and rotation of the latter moves carriages 64 laterally, away from each other, through the agency of respective racks 69 and 76.

As carriages 64 move apart, against the tension of spring 65, the respective presser members are caused to roll in opposite directions over the work, thus pressing the valve pad 17 onto the valve stem base flange 16a and onto the adjacent portions of the tube structure, the normal tacky nature of the unvulcanized rubber of the pad causing it strongly to adhere to said parts. Since the pivot pins 82 are eccentrically disposed with relation to the perimeter of the respective presser elements 83, angular movement of the latter about their axes causes the carriages 64, which carry said pivot pins, and the slide 40 to move downwardly under the impetus of spring 54, whereby uniformity of pressure is maintained upon the work.

The carriages 64 reach the limits of their lateral movement when the crosshead 50 reaches abutting relation with bearing bracket 57, as shown in Figure 5. Thereafter the operator reverses the position of valve 45 to discharge the upper end of cylinder 42 and concurrently to charge the lower end thereof, whereby the crosshead 50 is lifted, the slide 40 rises, and spring 65 moves carriages 64 together again, the movement of said carriages rolling presser members 83 backward over the work so that they are brought together in proper angular position, the weights 90 in the presser members assisting in moving them to proper position. As the slide 40 rises, the movement of roller 109 along bell crank arm 101 permits spring 104 to move said bell crank to the position shown in Figure 4, whereby the centering block 105 is moved forwardly to work-receiving position. This completes a cycle of operation of the unit B. The operator then removes the work from the unit and places it upon conveyor C which removes it to another station for subsequent operations.

The valve pad is compacted and pressed onto the valve stem base flange and tube structure by yielding rolling pressure in a single brief operation. The improved method saves time and labor and accomplishes the other objects set out in the foregoing statement of objects.

Although the yielding pressure is obtained in part by the provision of the resilient rubber surface on the presser members 83, it is contemplated that said presser members may be made entirely of metal, and the yielding feature obtained entirely by the use of the resilient pad 96 on supporting plate 93, in which case said pad may be of greater thickness than herein shown.

Other modification may be resorted to without departing from the spirit of the invention or the scope of the appended claims, which are not limited wholly to the specific construction shown or exact procedure described.

What is claimed is:

1. The method of making inner tubes which comprises forming an aperture in an unvulcanized rubber tube, lightly adhering a valve stem structure to the tube with the axial passage of the valve stem in registry with said aperture, mounting a valve pad on the valve stem so as to overlie the base flange thereof and extend onto the adjacent tube structure, and then compacting the assembled structure by rolling pressure directed solely toward the margin of the said pad.

2. The method of making inner tubes which comprises forming an aperture in an unvulcanized rubber tube, lightly adhering a rubber valve stem structure to the tube with the axial passage of the valve stem in registry with said aperture, mounting a valve pad of unvulcanized rubber on the valve stem structure so as to overlie the base flange thereof and extend onto the adjacent tube structure, and then compacting the assembly by yielding rolling pressure moving from the valve stem toward the margin of the pad.

3. The method of making inner tubes which comprises assembling a valve stem having a rubber base flange upon an unvulcanized rubber tube, mounting an unvulcanized rubber valve pad upon said base flange and adjacent portion of the tube, and then compacting the assembly by yielding rolling pressure moving concurrently from opposite sides of the valve stem toward the margin of the valve pad.

4. In apparatus for making inner tubes, a work compacting unit comprising means for determinately positioning the valve stem of an inner tube in the unit, pressing means for applying rolling pressure to a valve pad about the base of said valve stem, and means for moving the valve-positioning means to an alternative position during the operation of said pressing means.

5. In apparatus for making inner tubes, work compacting mechanism comprising a yielding support for an inner tube, means for determinately positioning the valve stem of the tube on said support, a pair of rotatable presser members normally positioned above the work on said support, means for retracting the valve stem positioning means to an alternative position and concurrently lowering the presser members into engagement with the work about the base of said valve stem, and means for rolling said work pressing members away from the valve stem after they have engaged the work.

6. In apparatus for making inner tubes, work compacting means comprising a support for the work, a pair of rotatable presser members normally disposed above the work, said members having arcuate work-engaging surfaces that are eccentric with relation to their respective axes of rotation, means for yieldingly urging said members against the work, and means for rolling them over the work after they have engaged the same.

7. In apparatus for making inner tubes, the combination of a support for a tube, a pair of work presser members comprising generally semi-cylindrical structures normally disposed with their diametric surfaces in face to face relation above the work, said diametric faces being formed with a recess for receiving the valve stem of an inner tube, means for lowering said members into engagement with the work, and means for rolling their peripheral surfaces over the work after they have engaged the same.

8. A combination as defined in claim 7 in which the work-pressing members are journaled on respective axes that are eccentrically disposed with relation to their peripheral surfaces, including means for yieldingly urging said members toward the work as they roll thereover.

9. In apparatus for making inner tubes, the combination of a work support, a slide positioned above said support, means for raising and lowering said slide, laterally movable carriages on said slide, work-pressing members mounted upon the respective carriages, and means for laterally moving said carriages in timed relation to the movement of said slide.

10. In apparatus for making inner tubes, the combination of a work support, means for determinately positioning an inner tube on said support by engagement with the valve stem thereof, a slide positioned above said support, means for raising and lowering said slide, work pressing mechanism carried by said slide, and means on said slide for causing retraction of the tube-positioning means during the downward movement thereof.

11. In apparatus for making inner tubes, the combination of a support for an inner tube, a vertically movable slide positioned above said support, a pair of opposed carriages mounted for movement toward and away from each other on said slide, work-pressing members carried by the respective carriages, and a single power instrumentality for raising and lowering said slide and for effecting relative movement of the carriages thereon.

12. In apparatus for making inner tubes, the combination of a support for an inner tube, a vertically movable slide positioned above the said support, a pair of opposed carriages mounted for movement toward and away from each other on said slide, work-pressing members carried by said carriages, a power instrumentality, a yielding connection between the latter and the slide, and a positive connection between the power member and said carriages.

13. In apparatus for making inner tubes, the combination of a support for an inner tube, a vertically movable slide positioned above said support, a pair of carriages mounted for lateral movement relatively of said slide, work-pressing members carried by said carriages, a fluid pressure operated cylinder including a vertical piston rod, a crosshead carried by said piston rod, a yielding connection including a compression spring between said slide and said crosshead, and a positive connection comprising rack and pinion mechanism between said crosshead and said carriages.

14. A combination as defined in claim 13 including a yielding connection between the respective carriages normally urging them toward each other.

15. In apparatus for assembling valve stems with inner tubes, a work compacting unit comprising a rotatable work-pressing member formed with a recess adapted to receive the stem of a valve, and means for applying said member to a valve pad about the base of the valve stem of the tube and for rolling it toward the margin of said pad.

16. In apparatus for making inner tubes, work-compacting mechanism comprising a pair of work-pressing members of resilient material normally positioned above the work, said members being in the form of cylindrical segments with their flat faces abutting each other, means for lowering said members into engagement with the work, and means for moving said members laterally over the work, away from each other, after they engage the work.

17. In apparatus for making inner tubes, the combination of a resilient support for the work, work-compacting mechanism comprising a pair of work-pressing members normally positioned above said support and work, said members being in the form of cylindrical segments with their flat faces abutting each other, means for lowering said members into engagement with the work, and means for moving said members laterally over the work, away from each other, after they engage the work.

HORACE D. STEVENS.